United States Patent [19] [11] 3,926,990
Fukuba et al. [45] Dec. 16, 1975

[54] PROCESS FOR PREPARING AMIDE POLYPHOSPHATES

[75] Inventors: Kozo Fukuba; Yasutomo Ogushi; Minematsu Miyazaki, all of Niihama, Japan

[73] Assignee: Sumitomo Chemical Company, Ltd., Osaka, Japan

[22] Filed: Oct. 15, 1973

[21] Appl. No.: 406,416

[30] Foreign Application Priority Data
Oct. 16, 1972 Japan............................. 47-103780

[52] U.S. Cl....... 260/249.6; 260/564 H; 260/564 R; 260/553 R; 252/3; 169/1
[51] Int. Cl.²..............C07D 251/70; C07C 127/00; C07C 129/00
[58] Field of Search......... 260/249.6, 564 H, 564 R, 260/553 R

[56] References Cited
UNITED STATES PATENTS
3,300,395  1/1967  Michael et al............... 260/249.6 X
3,635,970  1/1972  Fessler et al.................... 260/249.6

*Primary Examiner*—John M. Ford
*Attorney, Agent, or Firm*—Sughrue, Rothwell, Mion, Zinn & Macpeak

[57] ABSTRACT

A process for preparing a substantially water insoluble amide polyphosphate which comprises heat-condensing together a phosphoric acid source as hereinafter defined and at least one cyanamide derivative as a nitrogen source in the presence of urea or urea phosphate or a mixture thereof as a condensing agent in a molar ratio of from 0.8 to 1.5 of urea and 0.05 to 1 of a cyanamide derivative per 1 mole of phosphoric acid at a temperature ranging from 150° to 350°C for a period sufficient to produce amide polyphosphates having a desired water insolubility is disclosed.

6 Claims, No Drawings

PROCESS FOR PREPARING AMIDE POLYPHOSPHATES

BACKGROUND OF THE INVENTION

1. Field of the Invention

This invention relates to a process for preparing amide polyphosphates which are substantially water insoluble. More particularly, this invention relates to a process for preparing a substantially water insoluble amide polyphosphate which comprises calcinating and condensing a phosphoric acid source and a cyanamide derivative in the presence of a condensing agent to produce the desired amide polyphosphate in high yield.

2. Description of the Prior Art

It is well known that ammonium polyphosphates can be used as an excellent flame retardant because of their high phosphur content and because they do not generate any toxic gas during their use. It is also well known that ammonium polyphosphates can be prepared from ammonium phosphate and urea or urea phosphate alone as described in Japanese Patent Publication No. 19218/1968 and U.S. Pat. No. 3,723,074 (corresponding to Japanese Patent Publication No. 434/1970). However, ammonium polyphosphates produced by the well known process generally contain substances of low degree of polymerization which are easily soluble in water and are not considered to be excellent materials as a whole in view of their poor water insolubility.

Ammonium polyphosphates have a disadvantage in that they are gradually eluted when ammonium polyphosphates are used in the place where they are frequently contacted with water or in the step where they are subjected to treatments with a large amount of water thereby decreasing the effect of ammonium polyphosphates. Also, when the ammonium polyphosphates prepared by the conventional process are used as a flame retardant in admixture with adhesives, paints for the surface treatment and the like, the swelling property of the ammonium polyphosphate is relatively low upon melt decomposition at high temperatures. It has been reported in Forest Products J., 10, 152 (1960) that a foam-swelled layer more than about 3m/m by melt decomposition is usually required, but when the conventional ammonium polyphosphate is used, it is difficult to satisfy the above requirement and a swelling agent such as dicyandiamide, guanidine, melamine and the like is generally employed together with the ammonium polyphosphate.

The ammonium polyphosphate obtained by a heat-condensation reaction of ammonium phosphate with urea or of urea phosphate is a straight chain compound represented by the formula

$$H_{(n-m)+2}(NH_4)_m P_n O_{3n+1}$$

wherein $n$ is an integer greater than about 10, m/n has a value between 0.7 and 1.1 and the maximum value of $m$ is equal to n+2. However, a slight non-uniformity in the reaction conditions during the conventional heat-condensation reaction tends to cause partial splitting off of $NH_3$ from the resulting ammonium polyphosphate, and such splitting off of $NH_3$ is considered to result in poor water-insolubility required for the ammonium polyphosphate product.

Further, the ammonium polyphosphates obtained by the heat-condensation reaction of ammonium phosphate with urea or of urea phosphate generally contain a small amount of compounds having an s-triazine ring which are produced as by-products by decomposition of urea, and these compounds contribute to a certain degree of swelling upon melt-decomposition of ammonium polyphosphates at high temeratures. However, when such s-triazine ring compounds as by-products are present in an extremely small amount, they do not contribute to the swelling property. For the reason set forth above, other swelling or foaming agents must be added to ammonium polyphosphates in the case where the ammonium polyphosphates containing an extremely small amount of s-triazine ring compounds are used as a flame retardant in order to obtain the desired flame-resistant property.

SUMMARY OF THE INVENTION

As a result of extensive investigations in order to eliminate the disadvantages associated by the conventional ammonium polyphosphates, the present inventors found that a substantially water insoluble amide polyphosphate exhibits a very small loss due to draining off from the system because of its low solubility in water when it is used for imparting flame resistance.

Thus, the present invention is directed to a process for preparing a substantially water insoluble amide polyphosphate which comprises heat-condensing together at least one phosphoric acid source such as ammonium orthophosphate, urea phosphate, melamine phosphate, phosphoric anhydride, polyphosphoric acid, orthophosphoric acid and a mixture thereof and at least one cyanamide derivative as a nitrogen source such as melamine, dicyandiamide, guanidine, guanyl-urea and a mixture thereof in the presence of a condensing agent such as urea, urea phosphate and a mixture thereof.

DETAILED DESCRIPTION OF THE INVENTION

In the conventional flame resistant treatment, a considerably large amount of flame retardants was lost mainly due to dissolution in water. Since the amide polyphosphates of the present invention are substantially water insoluble, the loss of amide polyphosphates due to dissolution in water can remarkably be reduced when it is used as a flame retardant and, as a result, the flame resistant treatment can be accomplished effectively and economically with a relatively small amount of the flame retardant.

Also, the amide polyphosphate of the present invention exhibits a high swelling property upon melt-decomposition at high temperatures and, when it is used as a flame retardant, it generally does not require other foaming agents and swelling agents such as melamine, dicyandiamide, etc. Which are sometimes used together with the conventional ammonium polyphosphates flame retardants. Further, in the heat-condensation reaction by calcination according to the present invention, the foaming is reduced as compared with those observed in the heat-condensation reaction of ammonium phosphate with urea or of urea phosphate alone, and therefore the reaction of this invention can be effected advantageously in that the apparatus used for the calcination can be operated continuously in a stable condition and yet the condensation reaction proceeds uniformly.

The amide polyphosphate of the present invention makes it possible to increase the water resistance and humidity resistance of the materials treated with the amide polyphosphate as compared with those obtainable with the conventional flame retardants, and it can be used for a wide variety of applications, in particular, where such increased water and humidity resistances are required.

The substantially water insoluble amide polyphosphate obtained in accordance with the process of this invention is a polyphosphate containing an amide nitrogen, and the term "substantially water insoluble" used throughout the specification and claims of this invention refers to a solubility of about 1 g or less per 100 cc of water as determined by placing 10 g of the amide polyphosphate product into 100 cc of water at a temperature of 25°C.

The calcination in the process of this invention means that a phosphoric acid source, a cyanamide derivative as a nitrogen source and a condensing agent are blended and heated together at a temperature of from 150° to 350°C to effect hydrolysis of urea and simultaneously dehydration condensation of phosphoric acid, and to effect neutralization of phosphoric acid with ammonia gas generated from urea and an addition reaction of the cyanamide derivative. The heat-condensation is conducted for a period sufficient to convert the above starting materials into an amide polyphosphate having the desired water insolubility, generally for a period of from about 20 minutes to about 10 hours, preferably 1 to 6 hours.

The apparatus which can be used for the heat-condensation reaction of this invention includes an electric furnace and a mixer equipped with a heating means, and the like. In carrying out the condensation reaction in a continuous manner, a rotary kiln, a pug mill, conveyer belt and the like can advantageously be employed.

The heat condensation reaction by calcination can advantageously be carried out by dividing the whole condensation reaction into two steps, i.e., a low condensation step and a high condensation step and effecting the grinding operation of the product of the low condensation step between these two steps whereby the reaction proceeds very efficiently and uniformly. In the low condensation step, the starting materials turn into a molten state in a single phase and the phosphoric acid is neutralized and then condensed with the ammonia gas generated by hydrolysis of urea whereby the cyanamide derivative is partially added to the condensed product, resulting in the solidification of the condensed product. In the high condensation step, the condensed product formed in the low condensation step is further condensed to a high degree and simultaneously the addition of the cyanamide derivative is completed.

Since the heat-condensation reaction of this invention is a dehydration reaction, the presence of water in the starting materials adversely affects a smooth reaction and prevents the formation of a condensed product having the desired high degree of condensation. The product obtained in such a case is easily soluble in water. In order to avoid the formation of such water soluble products, it is necessary to sufficiently remove water which is, for example, contained in the starting materials. The moisture content in the starting materials should generally be lower than 3 percent by weight, preferably 2 percent by weight. When the moisture content is higher than 3 percent by weight, it has been found that amide polyphosphates having the desired water insolubility is hardly produced.

The phosphoric acid source which can be used in the present invention includes ammonium orthophosphate, urea phosphate, melamine phosphate, phosphoric anhydride, polyphosphoric acid, orthophosphoric acid and a mixture thereof. The cyanamide derivative as a nitrogen source which can be used in the present invention includes melamine, dicyandiamide, guanidine, guanylurea and a mixture thereof. Of these cyanamide derivative, melamine is preferred from the economical standpoint. The condensing agent which can be used in the present invention includes urea or urea phosphate. It will be understood that, since these condensing agents contain nitrogen, they also serve as a nitrogen source. Urea phosphate is particularly advantageous since it functions as a phosphoric acid source and a nitrogen source as well as a condensing agent.

The molar ratio of the starting materials, i.e., urea/phosphoric acid (as $H_3PO_4$)/cyanamide derivative, is 0.8 to 1.5/1/0.05 to 1, preferably 0.9 to 1.2/1/0.2 to 1. When the amount of urea if below the lower limit of the above range, the condensation of the produced amide polyphosphate does not proceed sufficiently and a substantially water insoluble product cannot be obtained. Contrary, when the amount of urea exceeds the upper limit of the above range, a considerably large amount of unreacted urea and a polymer of urea would be contained in the resulting product.

It is not preferred to use the cyanamide derivative in an amount exceeding the upper limit of the above range since the loss of cyanamide due to sublimation and/or decomposition increases during the calcination. Also, the use of an excess amount of cyanamide derivative results in a relative decrease in the phosphur content of the resulting product and the thus formed product would not exhibit a sufficient flame resistant effect. Contrary, when the amount of cyanamide derivative is below the lower limit of the above range, a product having a desired water insolubility cannot be obtained.

As is described previously, the condensation reaction according to the present invention can advantageously be carried out in two steps. The reaction temperature in the low condensation reaction can be maintained in the range of from 150° to 350°C, preferably in the range of from 180° to 300°C. At temperatures lower than 150°C, the resulting product would be water soluble. At temperatures higher than 350°C, the loss of cyanamide due to sublimation and/or decomposition increases which makes the process disadvantageous. The heating in the low condensation reaction is generally conducted for a period of from about 10 minutes to about 5 hours, preferably 1 to 3 hours. It will be apparent to those skilled in the art that the heating period varies depending upon the heating temperature used, with a lower temperature requiring a longer period of time. When the heating period is shorter than the lower limit of the above range (less than about 10 minutes), the reaction is not completed thereby resulting in a product which is easily soluble in water. When the heating period is longer than the upper limit of the above range, melamine tends to be lost.

In the conventional process for the production of ammonium polyphosphates, a volume of reaction mixture of ammonium phosphate and urea or urea phosphate alone extremely increases by a drastic foaming due to the decomposition of urea upon heating and thereby the reaction operation is frequently difficult to control adequately. However, the inclusion of the cyanamide derivative into the starting materials, preferably, in an amount of 0.20 mol per 1 mol of $H_3PO_4$ in accordance with the process of this invention makes it possible to reduce an excess of foaming and to control the operations easily whereby the efficiency of calcination can remarkably be increased.

The product from the low condensation reaction step is preferably ground to a grain size less than 20 mesh (U.S. Standard Mesh) in order to achieve a uniform reaction in the subsequent high condensation step.

The reaction temperature in the high condensation reaction step can preferably be maintained in the range of from 180° to 350°C, preferably in the range of from 200° to 330°C. At temperatures lower than 180°C, the resulting product would be water soluble. At temperatures higher than 350°C, the loss of melamine due to sublimation increases which makes the process disadvantageous. The heating in the high condensation reaction is generally conducted for a period of from about 10 minutes to about 5 hours, preferably 30 minutes to 3 hours. It will be apparent to those skilled in the art that the heating period varies depending upon the heating temperature used, with a lower temperature requiring a longer period of time. When the heating period is shorter than the lower limit of the above range (less than about 10 minutes), the degree of water insolubility of the product decreases. When the heating period is longer than the upper limit of the above range, the desired product tends to be decomposed.

It is preferred that the gaseous phase in the apparatus for the condensation reaction is maintained at an ammonia atmosphere during the whole period of calcination step. Particularly, in the high condensation reaction step, a partial pressure of ammonia more than 300 mmHg is required when the total pressure is 1 atmosphere.

Generally, the cyanamide derivative as a nitrogen source is added to the reaction system simultaneously with a phosphoric acid source and a condensing agent, but it may be added to the reaction system in the last half period of the low condensation reaction step or during the grinding step prior to the high condensation reaction step. However, the degree of water insolubility of the product obtained in case where the cyanamide derivative is added in the last half period of the low condensation reaction step or during the grinding step appears to be somewhat inferior to that of the product obtained by adding the cyanamide derivative simultaneously with the phosphoric acid source and the condensing agent.

As described above in detail, the amide polyphosphates prepared in accordance with the process of this invention can advantageously be used as a flame retardant because they are substantially water insoluble when they are employed in the conventional procedure for imparting the flame resistant property, for example, by dispersing the amide polyphosphates in water in the paper manufacture or coating the materials to be treated with the amide polyphosphates of this invention.

Ammonium polyphosphates represented by the general formula $$H_{(n-m)+2}(NH_4)_m P_n O_{3n+1}$$

wherein $n$ is an integer greater than about 10, and $m$ has a value approximately equal to $n+2$, have a relatively low solubility as about 2 g or less per 100 cc of water at normal temperature. However, it is noted that the solubility of the substantially water insoluble amide polyphosphates is even lower as about 1 g or less per 100 cc of water at normal temperatures. Additionally, the solubility of ammonium polyphosphates increases as an elution temperature is elevated whereas that of amide polyphosphates scarcely increases as an elution temperature is elevated. Therefore, almost no loss of the flame retardant is observed even if a temperature in the treatment step more or less increases. The relationship between an elution temperature and a percent elution with respect to sparingly water soluble ammonium polyphosphates and substantially water insoluble amide polyphosphates, respectively, was determined and shown in the table below.

Table

| Elution Temperature (°C) | 30 | 40 | 50 | 60 | 70 | 80 | 95 |
|---|---|---|---|---|---|---|---|
| Percent Elution[a] of Ammonium Polyphosphate[b] | 21 | 35 | 62 | 89 | 95 | 98 | 100 |
| Percent Elution[a] Amide Polyphosphate[c] | 2 | 4 | 5 | 6 | 7 | 8 | 9 | a. Percent eluted material when 10 g of the samples is placed into 100 cc of water and stirred at a given temperature for 1 hour (hereinafter the same).

b. N, 14.20 wt. percent; $P_2O_5$, 72.15 wt. percent; percent elution, 15.3 percent; pH: 5.60 in 1 percent solution c. N, 33.48 wt. percent; $P_2O_5$, 44.73 wt. percent; percent elution, 1.36 percent; pH: 8.26 in 1 percent solution Thus, the process of this invention comprises heating a phosphoric acid source and a cyanamide derivative as a nitrogen source in the presence of a condensing agent to effect the condensation of phosphoric acid and the addition reaction of the cyanamide derivative thereby providing a substantially water insoluble amide polyphosphate. This process can be carried out easily and economically and makes it possible to produce a substantially water insoluble amide polyphosphate in high yield.

The present invention is further illustrated by the following examples but they are not to be construed as limiting the scope of the present invention.

EXAMPLE 1

Ammonium phosphate (N, 12.1 wt. percent; $P_2O_5$, 62.4 wt. percent; $H_2O$, 0.1 wt. percent), urea (industrial grade) and melamine were mixed in a molar proportion of urea/phosphonic acid (as $H_3PO_4$)/melamine of 1:1:0.5 to prepare a material for calcination (melamine content, 26.5 wt. percent), and the resulting material was fed into a rotating indirect-heating oven maintained at a temperature between 260 and 270°C at a feeding rate of 60 Kg per hour. The calcined product was discharged from an outlet of the oven at a rate of about 40 Kg per hour. After the resulting product was ground to such a particle size that the whole product passes a 32 mesh screen (U.S. Standard), the product was again fed into the rotating indirect-heating oven at a feeding rate of 50 Kg per hour where it was calcined at a calcination temperature of 270°C. An ammonia-rich gaseous stream was passed through the calcination oven during the calcination, and the retention time of the material was 1.5 hours. The analysis of the resulting product is shown in Table 1 below.

Table 1

| Total Nitrogen (wt.%) | Ammoniacal Nitrogen (wt.%) | $P_2O_5$ (wt.%) | Percent Elution* | pH** |
|---|---|---|---|---|
| 34.52 | 8.15 | 44.03 | 0.31 | 7.30 |

*% eluted material as determined by placing 10 g of the product into 100 cc of water for 1 hour at 25°C.
**pH value determined for 1 g product/100 cc water.

EXAMPLE 2

A raw material prepared by mixing a crystalline urea phosphate (N, 17.5 wt. percent; $P_2O_5$, 44.6 wt. percent; $H_2O$, 0.5 wt. percent) and melamine (industrial grade) in a molar proportion of urea/phosphoric acid (as $H_3PO_4$)/melamine of 1/1/0.3 was continuously fed into a rotating indirect-heating oven at a feeding rate of 60 Kg per hour and heat-condensed while maintaining at a temperature of 240°C. The raw material did not show rapid foaming, and a white porous lumpy product was continuously discharged from the oven at a rate of about 42 Kg per hour. The analysis of the resulting product is as shown in Table 2 below.

Table 2

| Total Nitrogen (wt.%) | Ammoniacal Nitrogen (wt.%) | $P_2O_5$ (wt.%) | Percent Elution | pH |
|---|---|---|---|---|
| 29.56 | 10.25 | 50.55 | 6.57 | 7.60 |

The thus prepared product was ground to such a particle size that the whole product passes a 32 mesh screen (U.S. Standard) and then again continuously fed into a rotating indirect-heating oven maintained at 240°C at a feeding rate of 50 Kg per hour where it was calcined. An ammonia-rich gaseous stream was passed through the calcination oven during the calcination. After the retention time of about 1 hour, an amide polyphosphate having the analysis as shown in Table 3 below was discharged from an outlet of the oven.

Table 3

| Total Nitrogen (wt.%) | Ammoniacal Nitrogen (wt.%) | $P_2O_5$ (wt.%) | Percent Elution | pH |
|---|---|---|---|---|
| 28.44 | 9.43 | 49.29 | 0.44 | 7.30 |

COMPARATIVE EXAMPLE 1

In the same manner described in Example 2 but not using melamine, a crystalline urea phosphate was calcined at a feeding rate of 60 Kg per hour. The reaction in the low condensation zone was observed to proceed more rapidly than that of Example 2. The analysis of the product obtained from the high condensation zone is shown in Table 4 below. The existence of a chain ammonium polyphosphate was confirmed by the X-ray diffractiometry.

Table 4

| Total Nitrogen (wt.%) | Ammoniacal Nitrogen (wt.%) | $P_2O_5$ (wt.%) | Percent Elution | pH |
|---|---|---|---|---|
| 14.30 | 14.20 | 72.13 | 11.2 | 6.47 |

EXAMPLE 3

The same crystalline urea phosphate as used in Example 2, melamine phosphate (N, 37.45 wt. percent; $P_2O_5$, 31.5 wt. percent) prepared from a wet phosphoric acid and an equimolar amount of melamine, and urea (industrial grade) were mixed in a molar proportion of urea/phosphoric acid (as $H_3PO_4$)/melamine of 1/1/0.2 to prepare a raw material (melamine content, 13.8 wt. percent), and the resulting material was continuously fed into a rotating indirect-heating oven maintained at a temperature of 250°C at a feeding rate of 60 Kg per hour where it was calcined. The reaction did not proceed rapidly as observed in Example 2 and a white porous lumpy product was discharged from the oven at a rate of 40.8 Kg per hour. The anaylsis of the resulting product is shown in Table 5 below.

Table 5

| Total Nitrogen (wt.%) | Ammoniacal Nitrogen (wt.%) | $P_2O_5$ (wt.%) | Percent Elution | pH |
|---|---|---|---|---|
| 23.75 | 11.83 | 59.10 | 10.23 | 7.00 |

The resulting product was ground to such a particle size that the whole product passes a 32 mesh screen (U.S. Standard) and then again continuously fed into the rotating indirect-heating oven maintained at a temperature of 250°C at a feeding rate of 50 Kg per hour. The product was calcined under the retention time of about 1 hour while passing an ammonia-rich gaseous stream through the oven. The resulting product having the analysis as shown in Table 6 below was discharged from an outlet of the oven.

Table 6

| Total Nitrogen (wt.%) | Ammoniacal Nitrogen (wt.%) | $P_2O_5$ (wt.%) | Percent Elution | pH |
|---|---|---|---|---|
| 23.51 | 11.50 | 59.05 | 1.24 | 7.35 |

While the invention has been described in detail and with reference to specific embodiments thereof, it will be apparent to one skilled in the art that various changes and modifications can be made therein without departing from the spirit and scope thereof.

What is claimed is:

1. A process for preparing a substantially water insoluble amide polyphosphate which comprises heat-condensing together at least one phosphoric acid source selected from the group consisting of ammonium orthophosphate, urea phosphate, melamine phosphate, phosphoric anhydride, polyphosophoric acid and orthophosphoric acid and at least one cyanamide derivative as a nitrogen source selected from the group consisting of melamine, dicyanadiamide, guanidine and guanylurea in contact with a condensing agent selected from the group consisting of urea and urea phosphate and a mixture thereof in a molar ratio of urea/phosphoric acid (as $H_3PO_4$)/ cyanamide derivative of 0.8 to 1.5/1/0.05 to 1 at a temperature of from 150° to 350°C for a period sufficient to provide the desired water insolubility to the amide polyphosphate product.

2. A process according to claim 1 wherein said heat-condensation is carried out in two steps, the first step being conducted at a temperature ranging from 150° to 350°C for a period of from 10 minutes to 5 hours and the second step being conducted at a temperature ranging from 180° to 350°C for a period of from 10 minutes to 5 hours.

3. A process according to claim 2 wherein the product obtained in the first condensation step is ground before subjecting said product to the second condensation step.

4. A process according to claim 1 wherein said heat-condensation is carried out under a partial pressure of ammonia.

5. A process according to claim 4 wherein said partial pressure of ammonia is more than 300 mmHg.

6. A process according to claim 1 wherein said cyanamide derivative is introduced into a reaction system containing said phosphoric acid source and said condensing agent in the last half period of the first condensation step or the griding step.

* * * * *